(12) United States Patent
Tang et al.

(10) Patent No.: US 10,579,876 B2
(45) Date of Patent: Mar. 3, 2020

(54) METHODS AND SYSTEMS FOR SOCIAL RELATION IDENTIFICATION (71) Applicant: BEIJING SENSETIME TECHNOLOGY DEVELOPMENT CO., LTD., Beijing (CN)

(72) Inventors: Xiaoou Tang, Hong Kong (CN); Zhanpeng Zhang, Hong Kong (CN); Ping Luo, Hong Kong (CN); Chen Change Loy, Hong Kong (CN)

(73) Assignee: BEIJING SENSETIME TECHNOLOGY DEVELOPMENT CO., LTD, Haidian District (CN)

( * ) Notice: Subject to any disclaimer, the term of this patent is extended or adjusted under 35 U.S.C. 154(b) by 123 days.

(21) Appl. No.: 15/858,059

(22) Filed: Dec. 29, 2017

(65) Prior Publication Data
US 2018/0144193 A1 May 24, 2018

Related U.S. Application Data

(63) Continuation of application No. PCT/CN2015/083159, filed on Jul. 2, 2015.

(51) Int. Cl.
*G06K 9/72* (2006.01)
*G06K 9/00* (2006.01)
*G06K 9/66* (2006.01)

(52) U.S. Cl.
CPC ..... *G06K 9/00677* (2013.01); *G06K 9/00275* (2013.01); *G06K 9/00288* (2013.01); *G06K 9/66* (2013.01)

(58) Field of Classification Search
CPC ....... G06K 9/00228; G06K 2009/4666; G06K 9/00302; G06K 9/00315; G06K 9/00771; G06K 9/00375; G06K 9/00288; G06K 9/00671; G06K 9/6267; G06K 9/46; G06K 9/00335; G06K 9/00677; G06K 9/00275; G06K 9/6272; G06K 9/66; G06K 2209/27; G06K 9/00268; G06K 9/00718;
(Continued)

(56) References Cited

U.S. PATENT DOCUMENTS 9,373,076 B1 * 6/2016 Appelman .............. G06F 16/50
10,204,625 B2 * 2/2019 Mishra .................... G10L 25/51
(Continued)

FOREIGN PATENT DOCUMENTS

CN 103971131 A 8/2014
WO WO2014186333 A1 11/2014

OTHER PUBLICATIONS

International Search Report for International application No. PCT/CN2015/083159, dated Apr. 7, 2016, 3 pages.
(Continued)

*Primary Examiner* — Aklilu K Woldemariam
(74) *Attorney, Agent, or Firm* — Reising Ethington P.C.

(57) ABSTRACT

A method for identifying social relation of persons in an image, including: generating face regions for faces of the persons in the image; determining at least one spatial cue for each of the faces; extracting features related to social relation for each face from the face regions; determining a shared facial feature from the extracted features and the determined spatial cue, the determined feature being shared by multiple the social relation inferences; and predicting the social relation of the persons from the shared facial feature.

17 Claims, 8 Drawing Sheets

(58) Field of Classification Search
CPC .... G06K 9/4671; G06K 9/6202; G06K 9/627; G06K 9/6289; G06K 9/6807; G06K 9/4628; G06N 5/003; G06N 5/02; G06N 3/084; G06N 3/0454; G06Q 50/01; G06Q 10/06393; H04L 51/20; H04L 51/34; H04L 51/04; G06F 16/215; G06F 17/2785; G06F 7/026; G06F 16/5838; G06F 16/583; G06F 3/0482; G06F 16/50; G06F 16/9537; G06F 16/784; G06F 16/434; G06F 16/5866; A61B 3/113; A61B 5/1128; A61B 5/165; A61B 5/7267; H04N 7/183; H04N 5/23238; H04N 5/2624; H04N 1/0044; G06T 7/70; G06T 7/73; G08B 13/19608
USPC ........ 382/103, 118, 190, 197, 305; 343/143, 343/150
See application file for complete search history.

(56) References Cited

U.S. PATENT DOCUMENTS

| | | | | |
|---|---|---|---|---|
| 2006/0251292 A1* | 11/2006 | Gokturk | ............. | G06K 9/00375 382/103 |
| 2006/0251338 A1* | 11/2006 | Gokturk | ............. | G06K 9/00375 382/305 |
| 2006/0253491 A1* | 11/2006 | Gokturk | .............. | G06F 16/5838 |
| 2011/0157221 A1* | 6/2011 | Ptucha | ............... | H04N 1/00198 345/629 |
| 2011/0182482 A1* | 7/2011 | Winters | ............. | G06K 9/00288 382/116 |
| 2011/0263946 A1* | 10/2011 | el Kaliouby | ......... | A61B 5/1128 600/300 |
| 2014/0063236 A1* | 3/2014 | Shreve | ............... | G06K 9/00228 348/143 |
| 2015/0178554 A1* | 6/2015 | Kanaujia | ................. | G06T 19/20 382/118 |
| 2015/0286873 A1* | 10/2015 | Davis | ........................ | G06F 3/00 382/103 |
| 2015/0295879 A1* | 10/2015 | Jung | ...................... | H04L 51/32 709/204 |
| 2016/0371378 A1* | 12/2016 | Fan | ......................... | H04L 67/10 |
| 2017/0177722 A1* | 6/2017 | Cavalin | ................. | G06F 16/951 |
| 2017/0339340 A1* | 11/2017 | De Bayser | ............ | H04W 76/10 |

OTHER PUBLICATIONS

Written Opinion for International application No. PCT/CN2015/083159, dated Apr. 7, 2016, 4 pages.

* cited by examiner

METHODS AND SYSTEMS FOR SOCIAL RELATION IDENTIFICATION

CROSS REFERENCE TO RELATED APPLICATION

This application is a continuation of PCT/CN2015/083159, filed on Jul. 2, 2015 and entitled "Methods and Systems for Social Relation Identification", the entire disclosure of which is hereby incorporated by reference.

TECHNICAL FIELD

The present application relates to social relation identification, in particular, to a method and a system for social relation (e.g., warm, friendliness, and dominance, between two or more people) of persons in an image.

BACKGROUND

Social relation manifests when the relationships of persons with one another are established, reciprocated or deepened. The videos are becoming the mainstream medium to share information, which capture individuals with different social connections. Effectively exploiting such socially-rich sources can provide social facts other than the conventional medium-like text. Such a capability promises a wide spectrum of applications. For instance, an automatic social relation inference allows for relation mining from image collection in social network, personal album, and films.

The social relation traits or social relation defined in this application is based on the interpersonal circle proposed by Kiesler, where human relations are divided into 16 segments, but more attributes may be defined. Each segment has its opposite sides, such as "friendly and hostile". Therefore, the 16 segments may be considered as eight binary relation traits. For instance, "friendly" and "competitive" are easily separable because of the conflicting meanings. However, some relations are close such as "friendly" and "trusting", implying that a pair of faces may have more than one social relation.

SUMMARY

The following presents a simplified summary of the disclosure in order to provide a basic understanding of some aspects of the disclosure. This summary is not an extensive overview of the disclosure. It is intended to neither identify key or critical elements of the disclosure nor delineate any scope of particular embodiments of the disclosure, or any scope of the claims. Its sole purpose is to present some concepts of the disclosure in a simplified form as a prelude to the more detailed description that is presented later.

In one aspect of the present application, disclosed is a method for identifying social relations of persons in an image. The method may comprise generating face regions for faces of the persons in the image; determining at least one spatial cue for each of the faces; extracting features related to social relation for each face from the face regions; determining a shared facial feature from the extracted features and the determined spatial cue, the determined feature being shared by multiple the social relation inferences; and predicting the social relation of the persons from the shared facial feature.

In another aspect of the present application, disclosed is a system for identifying social relations of persons in an image. The system may comprise a face region generating device that generates face regions for faces of the persons in the image and determine at least one spatial cue for the faces; a feature extracting device being electronically communicated with the face region generating device and extracting features related to social relation for each face from the face regions; a feature determining device coupled electrically to the extracting device and determining a shared facial feature from the extracted features and the determined spatial cue, the determined feature being shared by multiple the social relation inferences; and a predicting device predicting the social relation of the persons from the shared facial feature.

In one embodiment, the feature extracting device may further comprise a convolutional neural network comprising a plurality of layers connected to each other, each of which has a plurality of neurons and all neurons in the same layer have a same weight on connections there between, and wherein the system further comprises: a training unit configured to train, with a predetermined training image set, the network to adjust the weights on connections between the neurons such that the trained network is capable of extracting the shared facial feature for social relation identification.

According to the present application, there is a method for training a convolutional neural network for performing social relation identification. The method may comprise sampling the predetermined training set to obtain a training face image containing two or more faces and its ground-truth social relation; comparing a predicted relation of each of the sampled faces and the corresponding ground-truth relation to generate a relation classification error; and back-propagating the generated error through the neural network to adjust weights on connections between the neurons until the relation classification error is less than a predetermined threshold.

In yet another aspect, disclosed is a system for identifying social relations of persons in an image. The system may comprise a memory that stores executable components. The system may further comprise a processor electrically coupled to the memory to execute the executable components to perform operations of the system, wherein, the executable components comprise: a face region generating component that generates face regions for faces of the persons in the image and determine at least one spatial cue for the faces; a feature extracting component being electronically communicated with the face region generating component and extracting features related to social relation for each face from the face regions; a feature determining component coupled electrically to the extracting component and determining a shared facial feature from the extracted features and the determined spatial cue, the determined feature being shared by multiple the social relation inferences; and a predicting component predicting the social relation of the persons from the shared facial feature.

In yet another aspect, disclosed is a system for identifying social relations of persons in an image. The system comprises a processor; and a memory storing instructions. The instructions, when executed by the processor, cause the processor to perform operations. The operations comprises: generating face regions for faces of the persons in the image and determining at least one spatial cue for the faces; extracting features related to social relation for each face from the face regions; determining a shared facial feature from the extracted features and the determined spatial cue, the determined feature being shared by multiple the social relation inferences; and predicting the social relation of the persons from the shared facial feature.

In one embodiment, the spatial cue comprises at least one of a position of each of the faces, a relative position of the faces and a scale ratio between the faces.

In one embodiment, the extracting features related to social relation for each face from the face regions comprises: extracting the features by a convolutional neural network comprising a plurality of layers connected to each other, each of which has a plurality of neurons and all neurons in the same layer have a same weight on connections therebetween. The operations further comprise: training, with a predetermined training image set, the network to adjust the weights on connections between the neurons such that the trained network is capable of extracting the shared facial feature for social relation identification.

In one embodiment, the extracting further comprises: bridging a gap of heterogeneous datasets by weak constraints derived from the association of face part appearances, so as to learn the shared facial feature more effectively from heterogeneous datasets with different annotations and statistical distributions.

In one embodiment, the training further comprises: sampling the predetermined training set to obtain a training face image containing two or more faces and its ground-truth social relation; comparing a predicted relation of each of the sampled faces and the corresponding ground-truth relation to generate a relation classification error; and back-propagating the generated error through the neural network to adjust weights on connections between the neurons until the relation classification error is less than a predetermined threshold.

In one embodiment, the social relation comprises at least one selected form a group consisting of dominant, competitive, trusting, warm, friendly, attached, demonstrative and assure.

In yet another aspect, disclosed is a computer program. The program comprises a computer readable code, wherein when the computer readable code is run on a device, a processor in the device executes an instruction for implementing each step in the method for identifying a social relation of persons in an image as described above.

In yet another aspect, disclosed is a non-transitory computer readable storage medium for storing a computer readable instruction. When the instruction is executed, a method for identifying a social relation of persons in an image is implemented. The method comprises: generating face regions for faces of the persons in the image; determining at least one spatial cue for each of the faces; extracting features related to social relation for the each face from the face regions; determining a shared facial feature from the extracted features and the determined spatial cue, the determined feature being shared by multiple the social relation inferences; and predicting the social relation of the persons from the shared facial feature.

In one embodiment, the spatial cue comprises at least one of a position of each of the faces, a relative position of the faces and a scale ratio between the faces.

In one embodiment, the method further comprises: extracting, by a convolutional neural network, the identification features; wherein the network comprises a plurality of layers connected to each other, each of which has a plurality of neurons and all neurons in same layers have a same weight on connections therebetween. The method further comprises: training, with a predetermined training image set, the network to adjust the weights on connections between the neurons such that the trained network is capable of extracting the shared facial feature for social relation identification.

In one embodiment, the extracting further comprises: bridging a gap of heterogeneous datasets by weak constraints derived from similar appearances in local parts of the each face.

In one embodiment, the training further comprises: sampling the predetermined training set to obtain a training face image containing two or more faces and its ground-truth social relation; comparing a predicted relation of each of the sampled faces and the corresponding ground-truth relation to generate a relation classification error; and back-propagating the generated error through the neural network to adjust weights on connections between the neurons until the relation classification error is less than a predetermined threshold.

In one embodiment, the social relation comprises at least one selected form a group consisting of dominant, competitive, trusting, warm, friendly, attached, demonstrative and assure.

In the embodiments of the present application, the sub-extractor training method for facial attributes may take advantages of at least one of (1) dealing with missing attribute labels from different datasets, and (2) bridging the gap of heterogeneous datasets by weak constraints derived from the association of face part appearances. This allows the claimed system and method to learn more effectively from heterogeneous datasets with different annotations and statistical distributions.

BRIEF DESCRIPTION OF THE DRAWING

Exemplary non-limiting embodiments of the present application are described below with reference to the attached drawings. The drawings are illustrative and generally not to an exact scale. The same or similar elements on different figures are referenced with the same reference numbers.

DETAILED DESCRIPTION

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations have not been described in detail in order not to unnecessarily obscure the present invention.

The terminology used herein is for purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Figure 1:
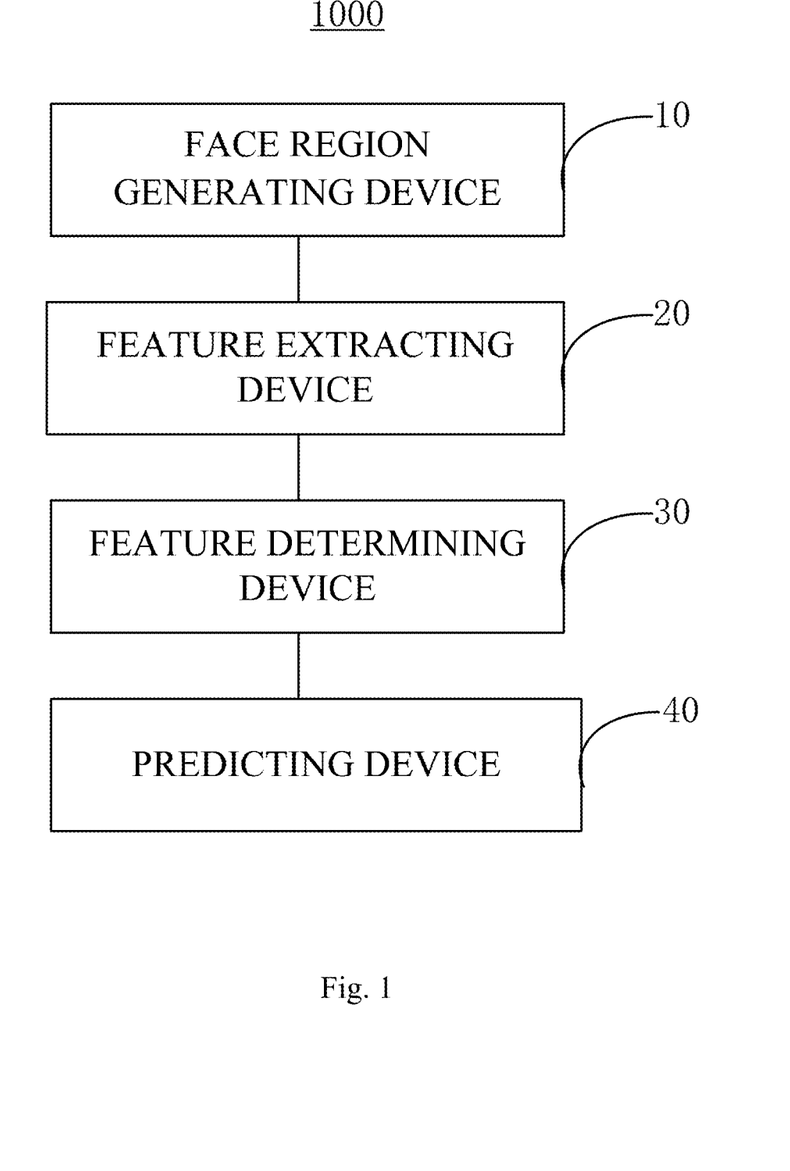
FIG. 1 is a schematic diagram illustrating an exemplary system for social relation identification consistent with some disclosed embodiments.

FIG. 1 is a schematic diagram illustrating an exemplary system 1000 for social relation identification consistent with some disclosed embodiments of the present application.

As shown in FIG. 1, the system 1000 comprises a face region generating device 10, a feature extracting device 20, a feature determining device 30 and a predicting device 40.

Figure 2:
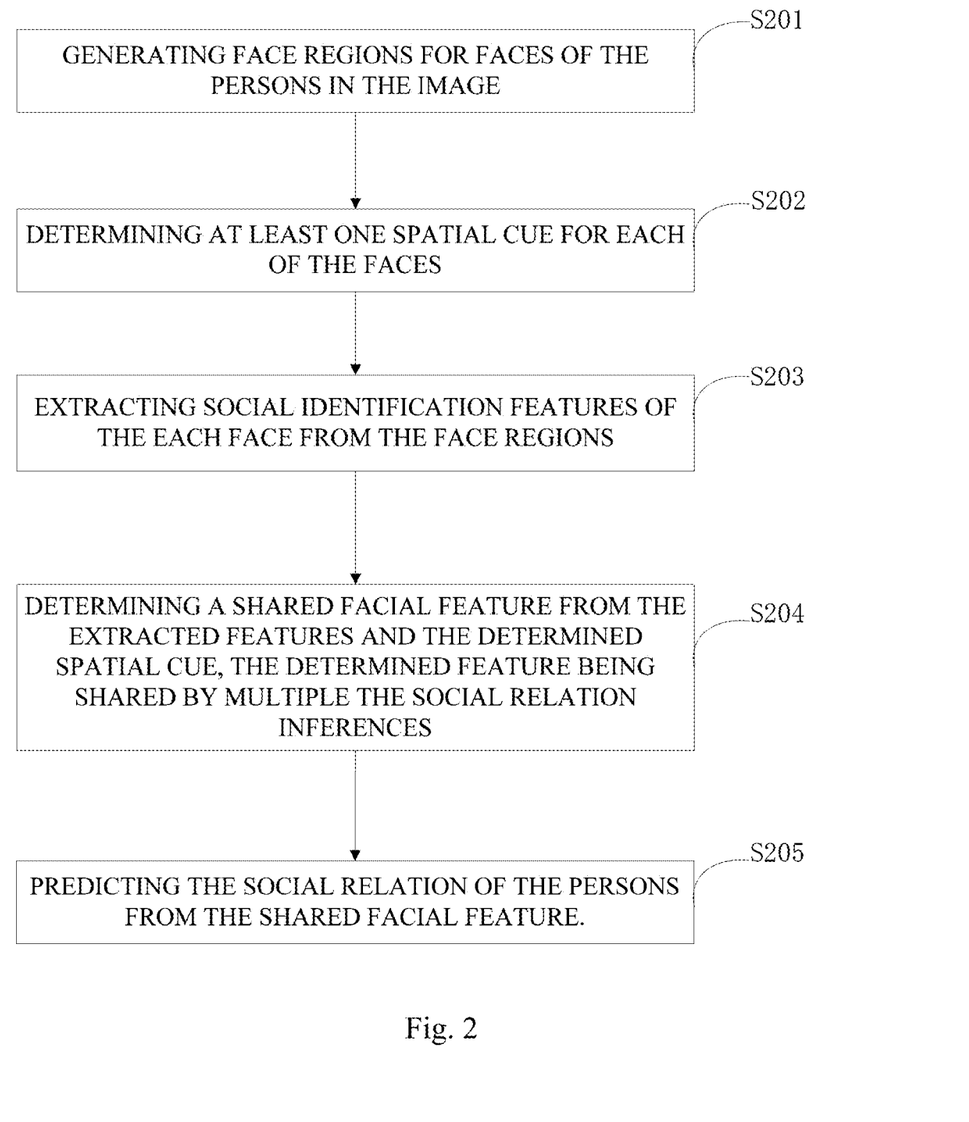
FIG. 2 is a schematic flowchart illustrating a process for social relation identification consistent with some disclosed embodiments.

FIG. 2 is a schematic flowchart illustrating a process 2000 for social relation identification consistent with some disclosed embodiments. As shown in FIG. 2, at step S201, the face region generating device 10 operates to generate face regions for faces of the persons in the image. At step S202, the feature extracting device 20 determines at least one spatial cue for each of the faces. At step S203, the feature extracting device 20 extracts social identification features of the each face from the face regions. At step S204, the feature determining device 30 determines a shared facial feature from the extracted features and the determined spatial cue, the determined feature being shared by multiple the social relation inferences. For example, the shared feature may be generated by concatenating the extracted features and the spatial cue. At step S205, the predicting device 40 predicts the social relation of the persons in the image from the shared facial feature.

Hereinafter, the more details for the face region generating device 10, the feature extracting device 20, the feature determining device 30 and the predicting device 40 will be further discussed.

In the present application, the system 1000 predicts the social relation of at least two persons in the input image. In particular, there are eight dimensions for the social relation description. Each relation is modeled as a single binary classification task. That means the output of the predicting device is a binary vector with a predetermined length. Take the eight-length as an example, the eight binary vectors may present dominant, competitive, trusting, warm friendly, attached, demonstrative and assured, respectively (see table 1). For example, the eight-length bit output "00111111" means the relation is NOT dominant, NOT competitive, but trusting, warm, friendly, attached Demonstrative and assured.

TABLE 1

| Relation | Descriptions | Example Pair |
|---|---|---|
| Dominant | one leads, directs, or controls the other/dominates the conversation/gives advices to the other | teacher & student |
| Competitive | hard and unsmiling/contest for advancement in power, fame, or wealth | people in a debate |
| Trusting | sincerely look at each other/no frowning or showing doubtful expression/not-on-guard about harm from each other | partners |
| Warm | speak in a gentle way/look relaxed/readily to show tender feelings | mother & baby |
| Friendly | work or act together/express sunny face/act in a polite way/be helpful | host & guest |
| Attached | engaged in physical interaction/involved with each other/not being alone or separated | lovers |
| Demonstrative | talk freely being unreserved in speech/readily to express the thoughts instead of keep silent/act emotionally | friends in a party |
| Assured | express to each other a feeling of bright and positive self-concept, instead of depressed or helpless | teammates |

Figure 3:
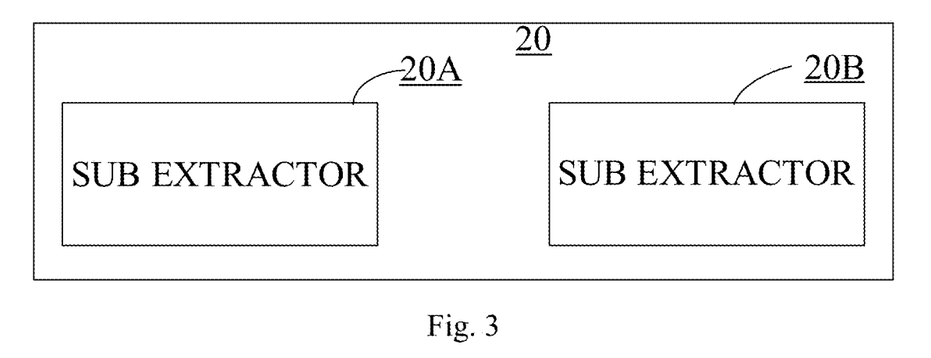
FIG. 3 is a schematic diagram illustrating the feature extracting device according to an embodiment of the present application.

In one example of the present application, the feature extracting device 20 may contain at least two sub-extractors 20A and 20B, as shown in FIG. 3.

Figure 4:
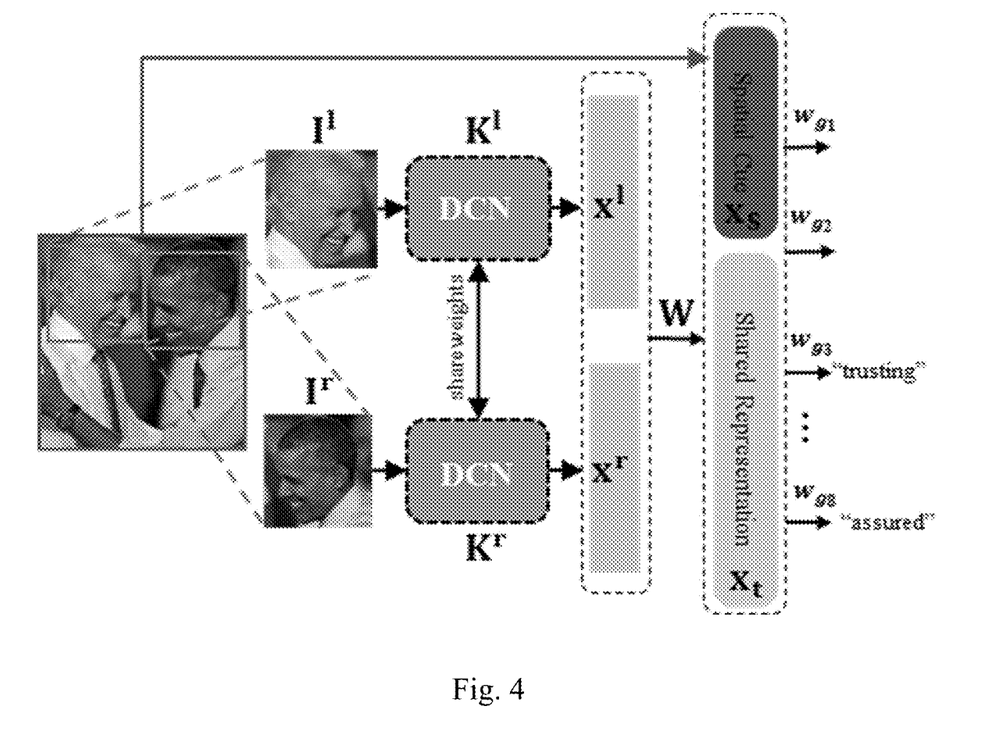
FIG. 4 is an example of a convolutional neural network for extracting features according to an embodiment of the present application.

According to an embodiment, the sub-extractors 20A and 20B may comprise a convolutional neural network. The network may comprise a plurality of layers connected to each other, each of which having a plurality of neurons and all the neurons in the same layer having a same weight on connection. FIG. 4 illustrates an exemplified convolutional neural network for extracting features. As shown in FIG. 4, the convolutional neural network comprises an input layer, a plurality of (for example, four or more) convolutional layers, a plurality of (for example, three) pooling layers and one fully connected layer. It shall be noted that the network is shown for exemplary, and the convolutional neural network in the feature extracting device 20 is not limited to it.

As shown in FIG. 4, a 48×48 (for example) face image is input in the input layer. After the convolution layers and max-pooling layers, the fully connected layer following the last convolutional layer (for example, the fourth convolutional layer shown in FIG. 4) produces a feature vector which is shared by the multiple attribute inference tasks to be estimated. Each layer contains a plurality of neurons with local or global receptive fields, and the weights on connections between the neurons of the convolutional neural network may be adjusted during the training, which will be discussed later. The feature generated by the fully connected layer (the "x" in FIG. 4) is the output feature of the sub-extractors 10A and 10B.

However, no single dataset is presently available, which encompasses all the required facial attribute annotations to learn such a rich representation (feature). In particular, some datasets only contain face expression labels, whilst other datasets may only contain the gender label. Moreover, these datasets are collected from different environments and exhibit different statistical distributions. Since faces from different datasets share similar appearance in local part, such as mouth and eyes, the present application proposes a bridging layer based on the local correspondence to cope with the different dataset distributions.

In an embodiment of the present application, this application establishes a face descriptor h based on the mixture of aligned facial parts. FIG. 4 shows an example, in which the aligned facial parts are used to build the face descriptor. Firstly, a three-level hierarchy is built to partition the facial parts, where each child node groups the data of its parents into clusters, such as $u_{2,1}^1$ and $u_{2,10}^1$. In the top layer, the faces derived from a training set are divided into multiple clusters by K-means using the landmark locations (e.g., mouth corners, nose and eyes). In the second layer, for each node, it performs K-means using the locations of landmarks in the upper and lower face region, and also obtains multiple clusters respectively. The mean HOG feature of the faces in each cluster is regarded as the corresponding template. Given a new sample, the descriptor h is obtained by concatenating its L2-distance to each template.

Figure 5:
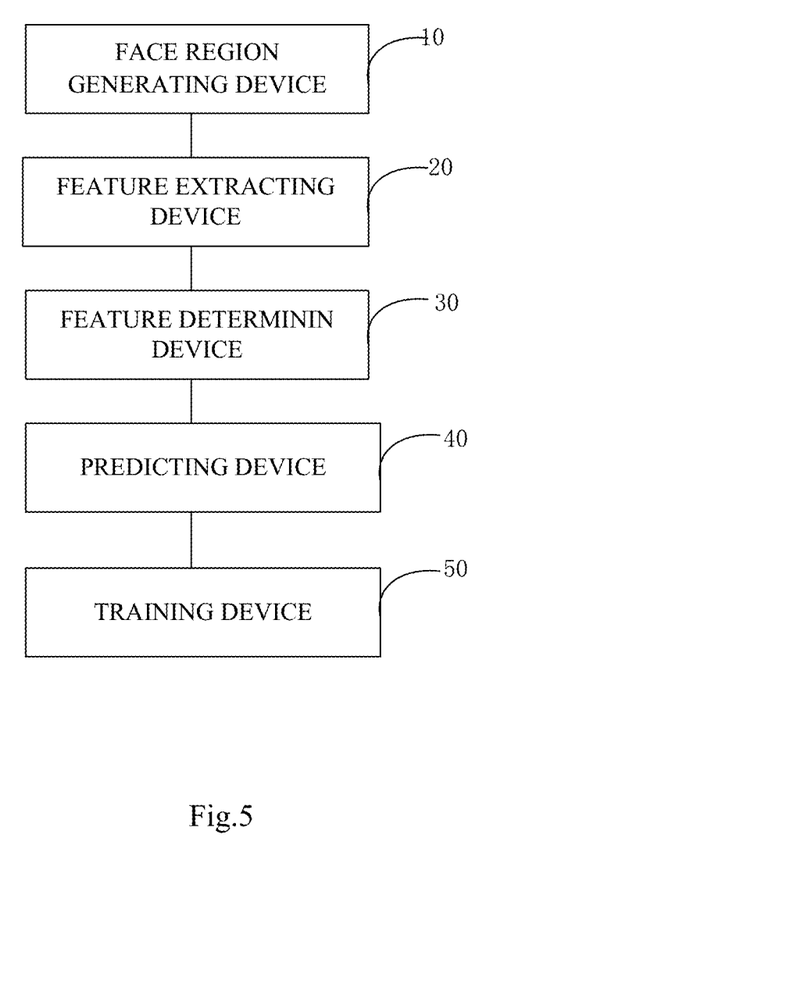
FIG. 5 is a schematic diagram illustrating an exemplary system for social relation identification according to an embodiment of the present application.

Additionally or alternatively, the system 1000 may further comprise a training device 50 to adjust the weights on connections between the neurons of the convolutional neural network, as shown in FIG. 5. The training device 50 can be trained with a predetermined training set label with some face attributes (e.g., gender, age and expression). The trained feature extracting device 20 is then capable of extracting the facial feature, which can predict the face attributes.

Figure 6:
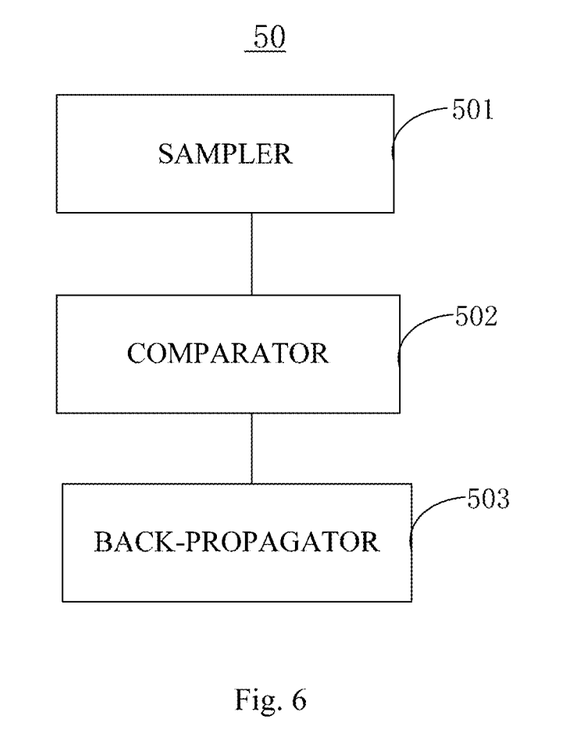
FIG. 6 is a schematic diagram illustrating a training device according to an embodiment of the present application.

According to one embodiment of the present application shown in FIG. 6, the training device 50 may comprise a sampler 501, a comparator 502 and a back-propagator 503.

The sampler 501 samples the predetermined training set to obtain a training face image containing a single face and its ground-truth face attributes (for example, the gender, hair color, head rotation). According to another embodiment, the ground-truth target for each attribute may be labeled manually. For example, for gender classification, the ground-truth target may be labeled as female (F) or male (M). For wearing glasses, the ground-truth target may be labeled as wearing (Y) or not wearing (N). For head pose estimation, (0°, ±30°, ±60°) may be labeled, and for expression recognition, such as smiling or angry may be labeled accordingly.

The comparator 502 may compare the predicted attributes and the ground-truth attribute to generate an attribute error. The attribute error may be obtained by using, for example, cross-entropy error.

The back-propagator 503 may back-propagate the generated attribute error through the convolutional neural network to adjust weights on connections between neurons of the convolutional neural network.

According to an embodiment, the training device 50 may further comprise a determiner 504. The determiner 504 may determine whether the training process of the facial attributes is converged.

Hereafter, components in the training device 50 as mentioned above will be discussed in detail. For purpose of illustration, an embodiment in which attributes are trained jointly by the training device 50 will be discussed.

For the attribute tasks, the training data is denoted as $(I_i, y_i^l)$, and $i=1, 2, 3 \ldots N$, $l=1, 2, 3 \ldots L$, where N represents number of the training data, I denotes the image pixels and L is the number of attributes. In one embodiment of the present application, there are four attribute tasks (L=4), which are shown and represented of "gender", "smiling", "angry" and "young" respectively. Thus, $y_i^g, y_i^s, y_i^a, y_i^y \in \{0, 1\}$ are binary attributes that represent female/male, not smiling/smiling, not angry/angry, not young/young respectively. Different weights are assigned to tasks, and are denoted as and $w_{yl}$ respectively.

Then, an objective function of all the attribute tasks is formulated as below to optimize the attribute inference tasks:

$$\operatorname*{argmin}_{K, w_{yl}} \sum_{l}^{L} \sum_{i=1}^{N} \lambda^l l^l(y_i^l, f(K(I_i); w_{yl})), \tag{1}$$

where, $f(K(I_i); w_{yl})$ is a linear function of $K(I_i)$ and a weight vector $w_{yl}$; $l^l$ represents loss function; $\lambda^l$ represents importance coefficient of l-th task's error; and $K(I_i)$ represents a shared facial feature extracted by the network weights According to one embodiment, cross-entropy functions are used as the loss function $l^l$ for attributes, to generate corresponding attribute binary classification errors. Therefore, the above objective function can be rewritten as below:

$$\operatorname*{argmin}_{K, w_{yl}} \sum_{i=1}^{N} \lambda^l y_i^l \log(p(y_i^l \mid K(I_i); w_{yl})) + \sum_{l=1}^{L} \|w_{yl}\|_2^2 + \|K\|_2^2 \tag{2}$$

In the Eq. (2), the first term is a posterior probability function, $$p(y_i = m \mid K(I_i)) = \frac{\exp\{(w_{yl}^j)^T K(I_i)\}}{\sum_j \exp\{(w_{yl}^j)^T K(I_i)\}},$$

where, $w_{yl}^j$ denotes the jth column of a weight matrix of the task 1. The second and third term penalizes large weights.

According to an embodiment, weights of all the tasks may be updated accordingly. In particular, the weight matrix $w_{yl}$ is updated by back propagation. The weight matrix of each task 1 may be calculated by $$\frac{\partial E^l}{\partial w_{yl}} = (p(y_i^l \mid K(I_i); w_{yl}) - y_i^l) K(I_i) \tag{3}$$

Then, the attribute error may be back-propagated by the back-propagator 503 through the convolutional neural network to adjust weights on connections between neurons of the convolutional neural network. If the attribute label is missing in the training dataset, the according error is set zero.

The above training process is repeated until the training process of the attribute error is determined by the determiner 504 to be converged. In other words, if the error stops decreasing for multiple iterations, the training process will be determined to be converged. With the above training process, the sub-extractor 20A/20B is capable of extract the feature vector from a given face image. According to one embodiment, for any face image $I_i$, the trained sub-extractor 20A/20B extracts a feature vector $K(I_i)$.

It should be noted that, though an example of two faces is used for clarification, it is not limited to only two faces. For example, three or more faces may be applicable.

Figure 7:
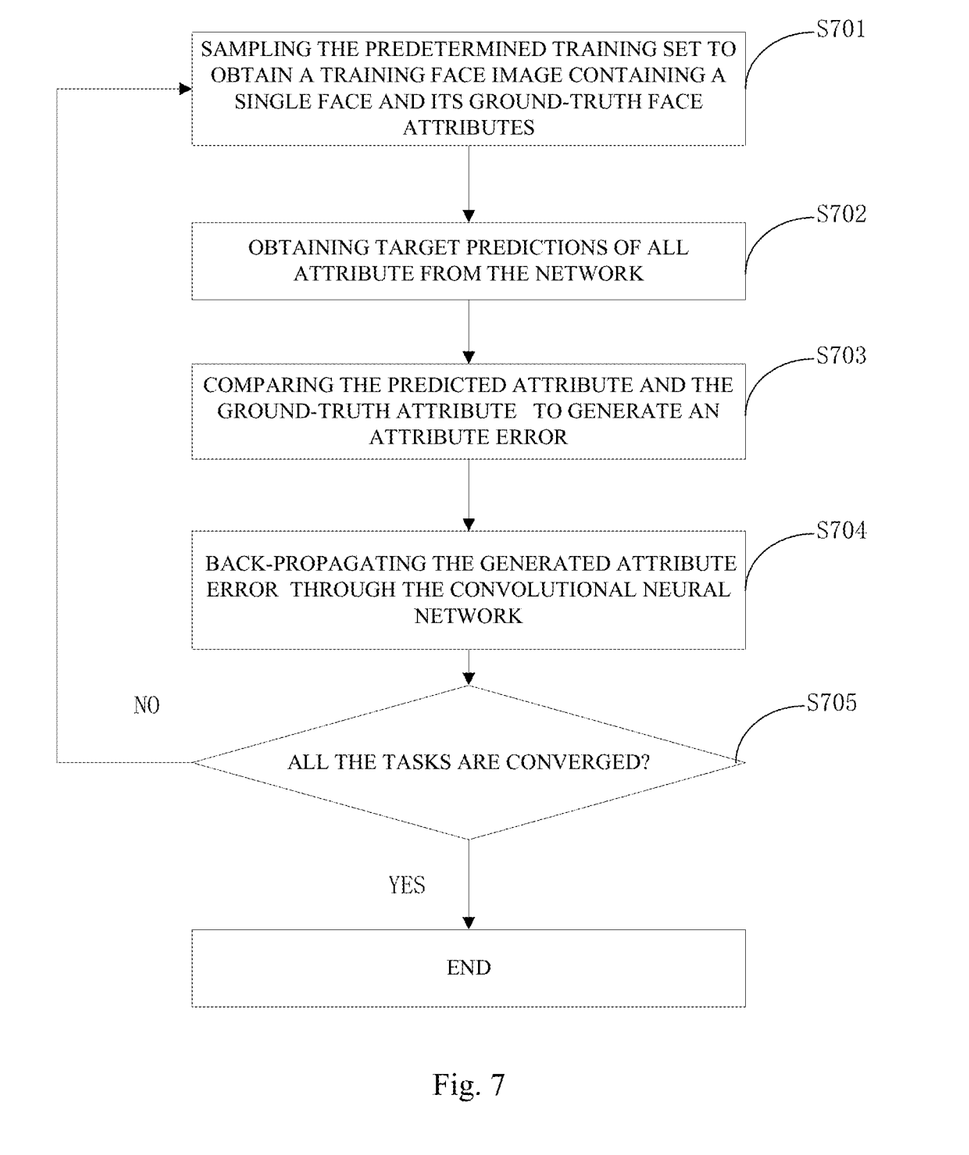
FIG. 7 is a schematic flowchart illustrating a method for training the feature extracting device according to an embodiment of the present application.

FIG. 7 is a flowchart showing the training step for the extracting device 20. In step S701, it samples the predetermined training set to obtain a training face image containing a single face and its ground-truth face attributes. For the training face image, its target predictions of all attributes may be obtained from the network accordingly in step S702. Then, the predicted attribute and the ground-truth attribute are compared to generate an attribute error in step S703. Then, the generated attribute error is back-propagated through the convolutional neural network to adjust weights on connections between the neurons of the convolutional neural network in step S704. In step S705, it is determined whether all the tasks are converged. If no, the process 700 turns back to step S701. Otherwise, the process 700 ends.

After the shared features are obtained, a logistic regression is conducted respectively to determine positive/negative for each of the social relation (e.g. the dominant, competitive, trusting, warm, friendly, attached, demonstrative and assure). For example, when the shared feature is denoted as x, a value y that represent the dominant may be computed by:

$$y = \frac{1}{1 + e^{-(wx)}}, \quad (4)$$

where the parameter w is learnt in the training process, which will be discussed in detail later.

The social relation of dominant is positive when y>0.5. For social relation classification tasks, the training data is denoted as $(I_i^r, I_i^l, g_i^t)$, and i=1, 2, 3 ... N, t=1, 2, 3 ... T, where N represents number of the training data. T is the number of social trait (e.g., in Table 1, T=8). $I_i^r$ and $I_i^l$ denote the right and left face, respectively. $\forall g_i^t \in \{0,1\}$ are binary values, indicating whether the according social trait is present or not. Different weights are assigned to relation tasks, and are denoted as $w_{g_t}$.

Some spatial cues will be incorporated to the feature determining device 30 as shown in step s 201 of FIG. 2, which may include at least one of: 1) two faces' positions, 2) the relative faces' positions, and 3) the ratio between the faces' scales. The above spatial cues are concatenated as a vector $x_s$, which are then concatenated with the feature $x_Q$. $x_Q$ is obtained by a linear projection of $x^r$, $x^l$ extracted by the sub-extractors 10A and 10B (i.e., $x^r=K(I^r)$, $x^l=K(I^l)$) for learning relation traits. In particular, $x_Q=W[x^r; x^l]$, where $[x^r; x^l]$ denotes the concatenation of the right face feature $x^r$, left face feature $x^l$. W is the weight matrix for projection.

The predictor 40 determines the social relation by linear regression: $g_t=w_g[x_Q; x_s]+\epsilon$, where $[x_Q; x_s]$ denotes the concatenation of face feature $x_Q$ and spatial cues $x_s$. $\epsilon$ is an additive error random variable, which is distributed following a standard logistic distribution ($\epsilon \sim$ Logistic(0,1)).

Then the objective function of training unit B can be formulated as:

$$\operatorname*{argmin}_{\Omega} \sum_{t=1}^{T} \{\|w_{g_t}\|^2 - (1-g_t)\ln(1-p(g_t=1 \mid x_Q, x_s)) -$$

$$g_t \ln(p(g_t=1 \mid x_Q, x_s))\} + \|K\|_2^2 + \|W\|_2^2$$

where K is the weight of the sub-extractors. Because the sub-extractors can be identical, they share the same K. W is the weight that project the left and right face feature to a common feature space. $\Omega = \{\{w_{g_t}\}_{t=1}^{8}, K, W\}$.

Figure 8:
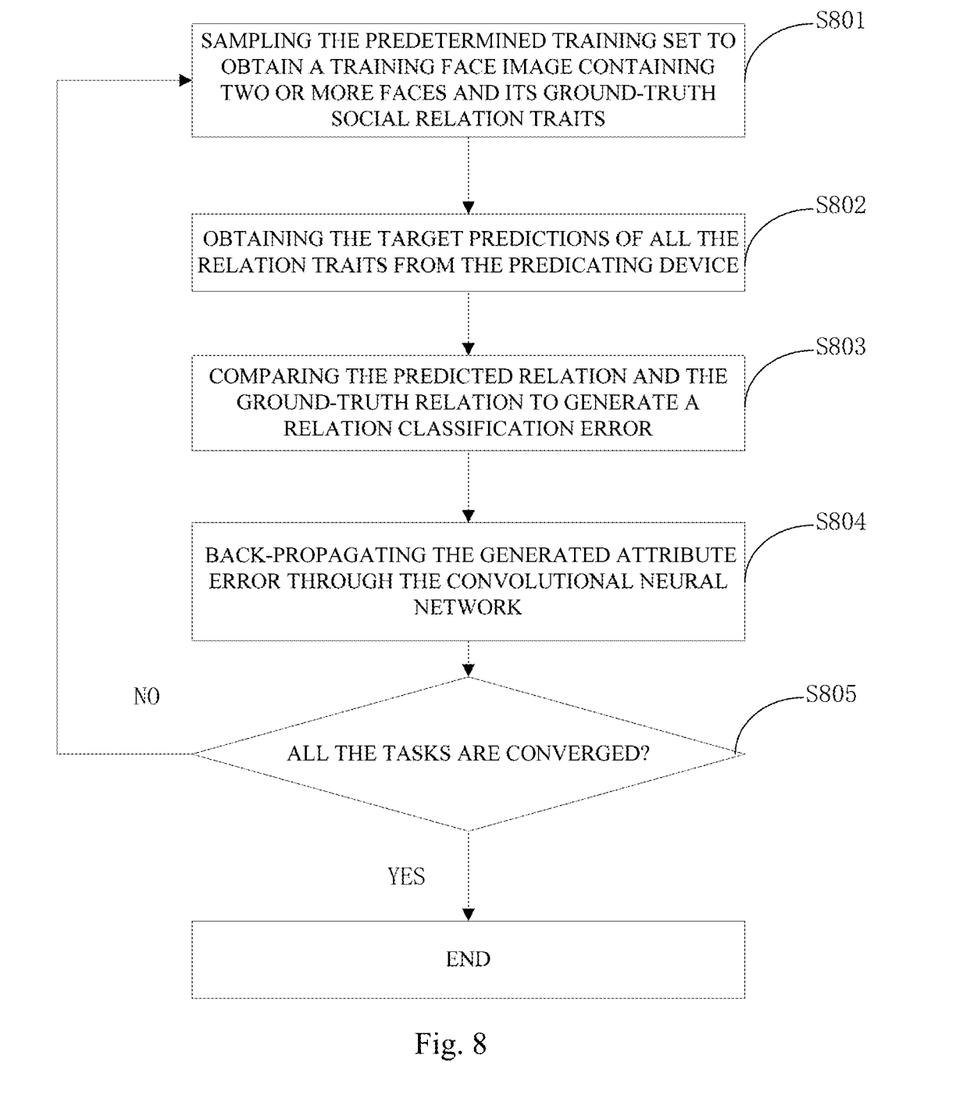
FIG. 8 is a schematic flowchart illustrating a method for training social relation identification according to one embodiment of the present application.

The training steps for social relation identification are shown in FIG. 8. In step S801, it samples the predetermined training set to obtain a training face image containing two or more faces and its ground-truth social relation traits. For the face regions, the target predictions of all the relation traits can be obtained from the predicating device 40 accordingly in step S802. Then, the predicted relation and the ground-truth relation are compared to generate a relation classification error in step S803. Then, the generated relation error is back-propagated through the convolutional neural network to adjust weights on connections between the neurons of the convolutional neural network in step S804. In step S805, it is determined whether the relation tasks are converged. If no, the process 800 turns back to step S801, otherwise, the process 800 ends.

As will be appreciated by one skilled in the art, the present invention may be embodied as a system, a method or a computer program product. Accordingly, the present invention may take the form of an entirely hardware embodiment and hardware aspects that may all generally be referred to herein as a "unit", "circuit," "module" or "system." Much of the inventive functionality and many of the inventive principles when implemented, are best supported with or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the embodiments.

Figure 9:
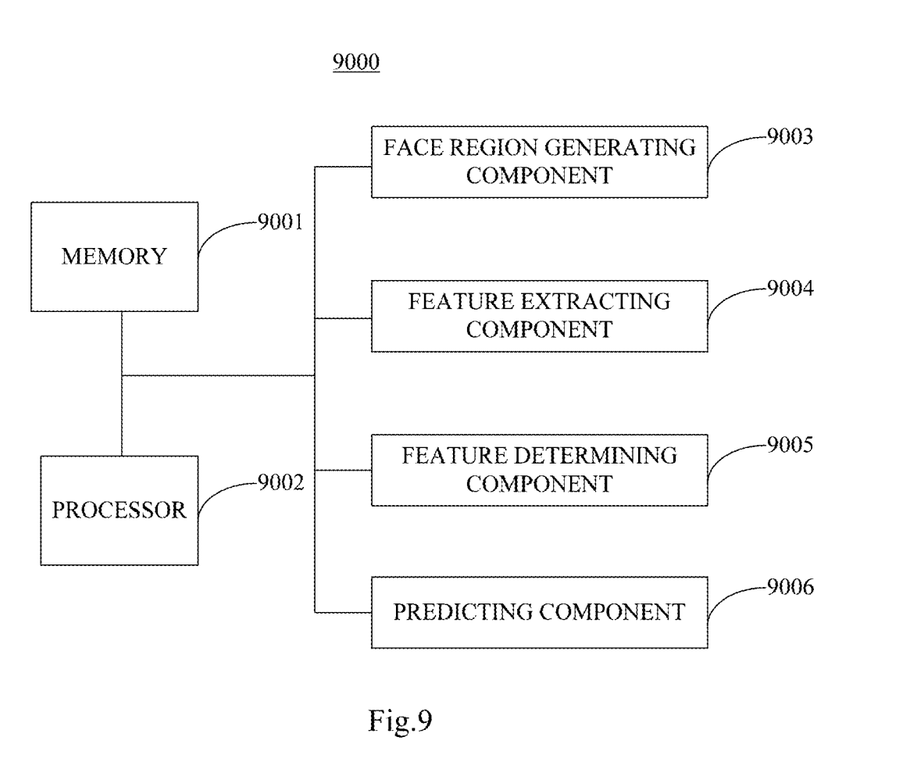
FIG. 9 illustrates a system for social relation identification according to one embodiment of the present application, in which the functions of the present invention are carried out by the software.

In addition, the present invention may take the form of an entirely software embodiment (including firmware, resident software, micro-code, etc.) or an embodiment combining software. Furthermore, the present invention may take the form of a computer program product embodied in any tangible medium of expression having computer-usable program code embodied in the medium. FIG. 9 illustrates a system 9000 for identifying social relations of persons in an image according to one embodiment of the present application, in which the functions of the present invention are carried out by the software. Referring to FIG. 9, the system 9000 comprises a memory 9001 that stores executable components and a processor 9002, electrically coupled to the memory 9001 to execute the executable components to perform operations of the system 9000. The executable components may comprise: a face region generating component 9003 that generates face regions for faces of the persons in the image and determine at least one spatial cue for the faces; a feature extracting component 9004 being electronically communicated with the face region generating component and extracting social identification features of the each face from the face regions; a feature determining component 9005 coupled electrically to the extracting component and determining a shared facial feature from the extracted features and the determined spatial cue, the determined feature being shared by multiple the social relation inferences; and a predicting component 9006 predicting the social relation of the persons from the shared facial feature. The functions of the components 9003-9006 are similar to those of the devices of 10-40, respectively, and thus the detailed descriptions thereof are omitted herein.

Some embodiments of the application are based on many persons, and therefore can be employed for interpersonal relation inference. Some embodiments of the application can recognize fine-grained and high-level social relation traits, instead of low-level relation like 'dialogue', 'monologue' and 'discussion'.

Although the embodiments of the present invention have been described, those skilled in the art can make variations or modifications to these examples upon knowing the basic inventive concept. The appended claims are intended to be considered as comprising the embodiments and all the variations or modifications fell into the scope of the present invention.

Obviously, those skilled in the art can make variations or modifications to the present invention without departing the scope of the present invention. As such, if these variations or modifications belong to the scope of the claims and equivalent technique, they may also fall into the scope of the present invention.

What is claimed is:

1. A method for identifying a social relation of persons in an image, comprising:
   generating face regions for faces of the persons in the image;
   determining at least one spatial cue for each of the faces, the spatial cue comprising at least one of a position of each of the faces, a relative position of the faces, or a scale ratio between the faces;
   extracting features related to social relation for each face from the face regions;
   determining a shared facial feature from the extracted features related to social relation and the determined spatial cue, the determined shared facial feature being shared by multiple social relation inferences; and
   predicting the social relation of the persons from the shared facial feature by linear regression;
   wherein the determining a shared facial feature from the extracted features related to social relation and the determined spatial cue comprises: concatenating the extracted features related to social relation and the determined spatial cue to generate the shared facial feature.

2. The method of claim 1, wherein the method further comprises:
   extracting, by a convolutional neural network, identification features; wherein the network comprises a plurality of layers connected to each other, each of which has a plurality of neurons and all neurons in same layers have a same weight on connections there between, and
   wherein the method further comprises:
   training, with a predetermined training image set, the network to adjust the weights on connections between the neurons such that the trained network is capable of extracting the shared facial feature for social relation identification.

3. The method of claim 2, wherein the extracting further comprises:
   bridging a gap of heterogeneous datasets by weak constraints derived from similar appearances in local parts of each face.

4. The method of claim 2, wherein the training further comprises:
   sampling the predetermined training set to obtain a training face image containing two or more faces and its ground-truth social relation;
   comparing a predicted relation of each of the sampled faces and the corresponding ground-truth relation to generate a relation classification error; and
   back-propagating the generated error through the neural network to adjust weights on connections between the neurons until the relation classification error is less than a predetermined threshold.

5. The method of claim 1, wherein the social relation comprises at least one selected form a group consisting of dominant, competitive, trusting, warm, friendly, attached, demonstrative and assured.

6. A system for identifying social relations of persons in an image, comprising:
   a processor; and
   a memory storing instructions, wherein the instructions when executed by the processor, cause the processor to perform operations, the operations comprising:
   generating face regions for faces of the persons in the image and determining at least one spatial cue for the faces, the spatial cue comprising at least one of a position of each of the faces, a relative position of the faces or a scale ratio between the faces;
   extracting features related to social relation for each face from the face regions;
   determining a shared facial feature from the extracted features related to social relation and the determined spatial cue, the determined shared facial feature being shared by multiple social relation inferences; and
   predicting the social relation of the persons from the shared facial feature by linear regression;
   wherein the determining a shared facial feature from the extracted features related to social relation and the determined spatial cue comprises: concatenating the extracted features related to social relation and the determined spatial cue to generate the shared facial feature.

7. The system of claim 6, wherein the extracting features related to social relation for each face from the face regions comprises:
   extracting the features related to social relation by a convolutional neural network comprising a plurality of layers connected to each other, each of which has a plurality of neurons and all neurons in the same layer have a same weight on connections therebetween, and
   wherein the operations further comprise:
   training, with a predetermined training image set, the network to adjust the weights on connections between the neurons such that the trained network is capable of extracting the shared facial feature for social relation identification.

8. The system of claim 7, wherein the extracting further comprises:
   bridging a gap of heterogeneous datasets by weak constraints derived from the association of face part appearances, so as to learn the shared facial feature more effectively from heterogeneous datasets with different annotations and statistical distributions.

9. The system of claim 7, wherein the training further comprises:
   sampling the predetermined training set to obtain a training face image containing two or more faces and its ground-truth social relation;
   comparing a predicted relation of each of the sampled faces and the corresponding ground-truth relation to generate a relation classification error; and
   back-propagating the generated error through the neural network to adjust weights on connections between the neurons until the relation classification error is less than a predetermined threshold.

10. The system of claim 7, wherein the social relation comprises at least one selected form a group consisting of dominant, competitive, trusting, warm, friendly, attached, demonstrative and assured.

11. A computer program, comprising a computer readable code, wherein when the computer readable code is run on a device, a processor in the device executes an instruction for implementing each step in the method for identifying a social relation of persons in an image according to claim 1.

12. A non-transitory computer readable storage medium for storing a computer readable instruction, wherein when the instruction is executed, a method for identifying a social relation of persons in an image is implemented, and the method comprises:

generating face regions for faces of the persons in the image;

determining at least one spatial cue for each of the faces, the spatial cue comprising at least one of a position of each of the faces, a relative position of the faces, or a scale ratio between the faces;

extracting features related to social relation for each face from the face regions;

determining a shared facial feature from the extracted features related to social relation and the determined spatial cue, the determined shared facial feature being shared by multiple social relation inferences; and predicting the social relation of the persons from the shared facial feature by linear regression;

wherein the determining a shared facial feature from the extracted features related to social relation and the determined spatial cue comprises: concatenating the extracted features related to social relation and the determined spatial cue to generate the shared facial feature.

13. The non-transitory computer readable storage medium of claim 12, wherein the spatial cue comprises at least one of a position of each of the faces, a relative position of the faces and a scale ratio between the faces.

14. The non-transitory computer readable storage medium of claim 13, wherein the method further comprises:

extracting the features related to social relation, by a convolutional neural network; wherein the network comprises a plurality of layers connected to each other, each of which has a plurality of neurons and all neurons in same layers have a same weight on connections therebetween, and wherein the method further comprises:

training, with a predetermined training image set, the network to adjust the weights on connections between the neurons such that the trained network is capable of extracting the shared facial feature for social relation identification.

15. The non-transitory computer readable storage medium of claim 14, wherein the extracting further comprises:

bridging a gap of heterogeneous datasets by weak constraints derived from similar appearances in local parts of the each face.

16. The non-transitory computer readable storage medium of claim 14, wherein the training further comprises:

sampling the predetermined training set to obtain a training face image containing two or more faces and its ground-truth social relation;

comparing a predicted relation of each of the sampled faces and the corresponding ground-truth relation to generate a relation classification error; and back-propagating the generated error through the neural network to adjust weights on connections between the neurons until the relation classification error is less than a predetermined threshold.

17. The non-transitory computer readable storage medium of claim 12, wherein the social relation comprises at least one selected form a group consisting of dominant, competitive, trusting, warm, friendly, attached, demonstrative and assured.

* * * * *